J. BLACKIE.
Electric Register.

No. 63,201. Patented March 26, 1867.

Witnesses:

Inventor:
John Blackie
By Dodge & Munn
his attorneys

United States Patent Office.

JOHN BLACKIE, OF NEW YORK, N. Y.

*Letters Patent No. 63,201, dated March 26, 1867.*

---

IMPROVEMENT IN ELECTRO-MAGNETIC APPARATUS FOR REGISTERING VOTES.

---

*The Schedule referred to in these Letters Patent and making part of the same.*

---

TO ALL WHOM IT MAY CONCERN:

Be it known that I, JOHN BLACKIE, of New York, in the county of New York, and State of New York, have invented certain new and useful improvements in Electrical Instruments for Recording Votes; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in the constructing of an instrument by which a series of balls are caused to be moved from either side of the dial or face, and be deposited in tubes, to indicate or represent the votes of legislators or similar persons, at the will of the voter, the same to be operated by electricity.

Figure 1:
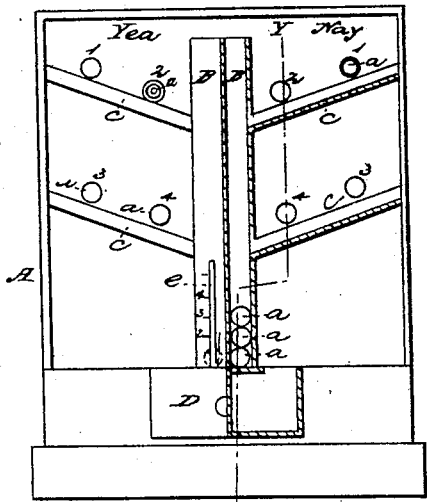
Figure 1 is a front view, with a portion shown in section on the line $x\ x$ of fig. 3.
Figure 3:
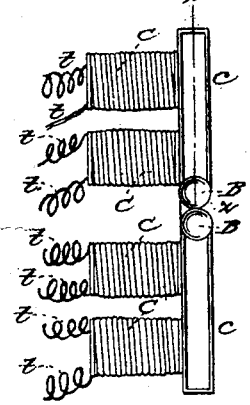
Figure 3 is a top plan view of a pair of the magnets or coils and receiving troughs on each side of the face or dial.
Figure 2:
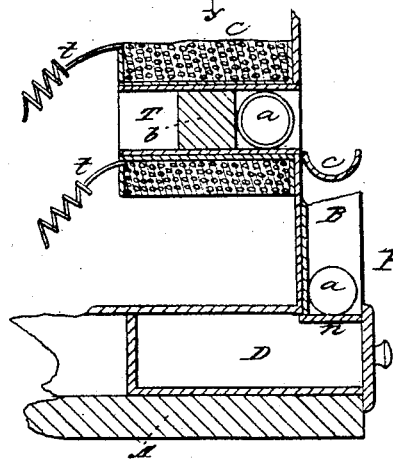
Figure 2 is a vertical section taken on the line $y\ y$ of fig. 1.

The motive or operating part of my apparatus consists of an electro-magnet of novel construction, as shown at C, of fig. 2, where it is represented in longitudinal section. I construct this magnet by taking a tube of soft iron, as represented by T, and winding around it an insulated wire, the same as in ordinary magnets $t\ t$, representing the two ends of the wire leading to the battery. The centre of this tube I fill with a piece of card-board as shown by $b$, or by any similar substance, which I do for the purpose of preventing the ball $a$ from rolling through and falling out at the opposite end of the tube when the latter is inclined, as hereinafter explained. I then construct for use in connection with this magnet a hollow iron ball, $a$, the object of making it hollow being to render it light so as to be easily moved, and thus require less battery power to operate the device. These balls I make by striking up, in suitable dies, hemispheres of sheet metal, which are then fitted and soldered together, and then turned off perfectly round and smooth on their outer surface. Having provided a sufficient number of these magnets and a corresponding number of balls, I arrange the magnets in any suitable frame or box in rows, side by side, the row being inclined from the centre upward toward the outer edge of the frame or box, as indicated by the series of holes 1, 2, &c., in fig. 1, these holes being simply the ends of the tubes T, where they protrude through or come nearly flush with the face of the frame A. Any required number of these rows of magnets may be thus arranged one above another in the frame, and the rows may consist of any desired number of magnets thus arranged. The series of magnets and balls on one side, as, for instance, on the right in this case, will represent the nays, while those on the left will represent the yeas, there being, of course, as many of each as there are persons to vote. In front of each row of magnets is arranged an inclined spout or trough, $c$, as shown in figs. 1 and 2, these spouts joining at their lower ends to a vertical tube, B, which has an opening or hole in its side opposite the end of the spout of sufficient size to permit the ball $a$ to enter, as shown in fig. 1, where the right-hand tube B is shown in section for the purpose of exhibiting these openings. The vertical tubes B should be of such length below the mouth of the lowest spout as to contain all the balls on that side of the frame; and it should be made of glass, or, if of metal, should have a slit or opening in it, as represented by $e$ of fig. 1, for the purpose of permitting the balls $a$ to be seen and counted when therein. These tubes B should also be graduated and numbered with marks opposite each ball, so that the number that may be in the tubes can be seen and told at a glance. In the bottom of the frame or box A is located a drawer, D, as shown in figs. 1 and 2, this drawer being located so as to receve the balls $a$ as they pass from the lower ends of the tubes B. To prevent the balls $a$ from passing from the tubes prematurely, a stop, $n$, is attached to the drawer in such a position as to close the lower ends of said tubes when the drawer is closed, as represented in fig. 2. When the drawer is drawn slightly forward the stop $n$ is removed from under the tubes B, which permits the balls $a$ to pass down into the drawer D, from whence they can be replaced in the tubes T when desired for use. The magnets will of course be connected with a battery in the usual manner; the circuit being broken and closed by means of a spring and knob or handle located at the desk or seat of each voter, the magnet with which he communicates being numbered to correspond with the number of his seat, or, if preferred, his name may be added as well as the number. As each person must have the means of voting either yea or nay at will, there will of course be two knobs, one answering to the yea ball, on the left-hand side (in this case,) and the other to the nay ball on the right-hand side, both balls being marked with the same number or name of the voter. With a magnet constructed as I have described, whenever a current of electricity is sent through the wire $t$ or coil, the end of the tube T will become a pole of the magnet, and will attract the iron ball $a$ to it. The ball $a$ being placed inside of the tube T at or near its centre, as shown in fig. 2, will be drawn outward to the end of the tube, and the momentum or impulse thus imparted to the ball $a$ will carry it entirely out of the tube, when, although it may be still attracted by the end thereof, it will drop down into the spout $c$, and rolling down the incline will enter the tube B and drop to the bottom thereof, the successive balls entering the tube being arranged one above another as shown in fig. 1. If the current should be of such intensity as to cause the ball to adhere to the end of the tube T and prevent it from falling into the spout $c$, it is obvious that the moment the current is broken, which must occur as soon as the hand of the voter is removed from the knob, it will then be released and pursue its course into the tube B.

To perform the operation, the balls $a$ are first placed one in each cell or tube T, as represented in figs. 1 and 2, these tubes being slightly inclined backward to prevent the balls from falling out prematurely. When a member's name is called, he touches the yea or nay knob at his desk, and instantly the ball corresponding to his number on the side corresponding with the knob he has touched, leaps out of its cell and passing along the inclined spout falls into the tube B on the yea or nay side, as the case may be ; and thus as each member in succession touches his knob, his ball arranges itself in the proper tube on the yea or nay side according as he desires to record his vote. The sum total of the votes on either or both sides can then be told at a glance by the numbers on the tubes B, and thus the voting is accomplished and the result told in a infinitely short space of time. When the voting is over, the draw D is pulled forward, which permits the balls to fall from the tubes B into the drawer, from whence they are taken by a boy or other attendant and replaced in the cells at leisure. It will thus be seen that the object is accomplished in a most efficient and speedy manner and by an exceedingly simple device, in which there is not a single joint or moving piece of mechanism except the knob for closing the circuit. By the peculiar construction of the magnet, and the use of the hollow ball, the apparatus can be operated with an exceedingly small battery, and at a trifling expense, and without liability of becoming deranged.

Having thus described my invention, what I claim, is—

1. The combination of a series of hollow magnets for ejecting the balls, as described, with the receiving troughs $c$, and tubes B, arranged to operate substantially as shown and described.

2. In combination with the tubes B open at their lower ends, I claim the drawer D provided with the stop $n$, when arranged to operate as herein described.

JOHN BLACKIE.

Witnesses:
    W. C. Dodge,
    P. T. Dodge.